United States Patent
Meisel et al.

(10) Patent No.: US 7,028,969 B2
(45) Date of Patent: Apr. 18, 2006

(54) SEISMICALLY RESTRAINED VIBRATION ISOLATING MOUNTING DEVICE

(75) Inventors: Paul W. Meisel, Dublin, OH (US); Richard S. Sherren, Pataskala, OH (US)

(73) Assignee: Kinetics Noise Control, Inc., Dublin, OH (US)

( * ) Notice: Subject to any disclaimer, the term of this patent is extended or adjusted under 35 U.S.C. 154(b) by 0 days.

(21) Appl. No.: 10/218,536

(22) Filed: Aug. 14, 2002

(65) Prior Publication Data

US 2004/0036002 A1 Feb. 26, 2004

(51) Int. Cl.
*F16M 13/00* (2006.01)

(52) U.S. Cl. .................. 248/638; 267/196; 248/562

(58) Field of Classification Search ............... 248/638, 248/565, 562, 581, 583, 660, 612, 614, 662, 248/578, 573, 575, 576, 550, 595; 267/196, 267/136; 188/136; 52/167.1

See application file for complete search history.

(56) References Cited

U.S. PATENT DOCUMENTS

| | | | | | |
|---|---|---|---|---|---|
| 1,763,682 | A | * | 6/1930 | Wallace | 248/570 |
| 2,117,919 | A | * | 5/1938 | Summers | 248/581 |
| 2,174,216 | A | * | 9/1939 | Rosenzweig | 29/235 |
| 2,209,862 | A | * | 7/1940 | Trott | 248/603 |
| 2,439,739 | A | * | 4/1948 | Hussman | 248/578 |
| 3,348,796 | A | * | 10/1967 | Baratoff et al. | 248/565 |
| 4,356,992 | A | | 11/1982 | Benkert | |
| 4,537,382 | A | * | 8/1985 | Beck | 248/568 |

* cited by examiner

*Primary Examiner*—Ramon O Ramirez
(74) *Attorney, Agent, or Firm*—Kathleen K. Bowen

(57) ABSTRACT

A seismically restrained vibration isolating mounting device seismically restrains and vibrationally isolates equipment which is supported by an equipment support means, from the equipment mounting surface. This seismically restrained vibration isolating mounting device is comprised of a three-axis snubber mounted to the equipment mounting surface and which restrains the equipment support means; and a vibration isolator, wherein the equipment support means is supported by the vibration isolator and wherein the vibration isolator is supported by the equipment mounting surface, wherein the vibration isolator acts in the direction of gravity, and wherein the three axis-snubber is closer to the equipment supporting surface than the vibration isolator, and the vibration isolator is external to the three-axis snubber.

4 Claims, 5 Drawing Sheets

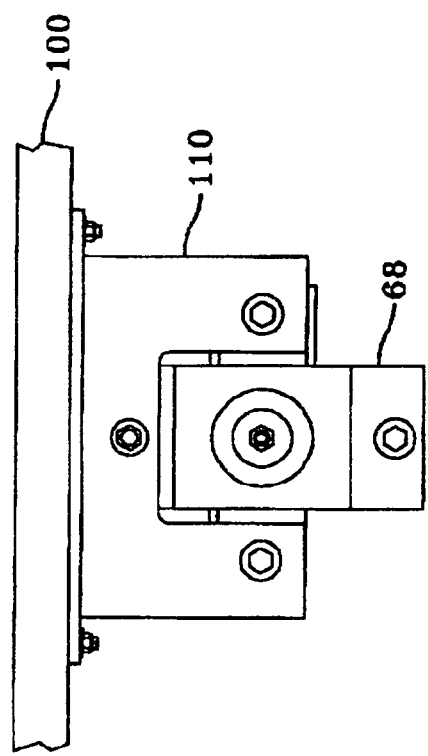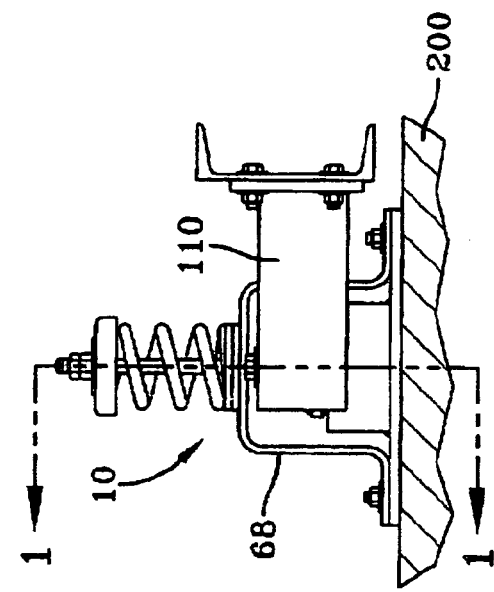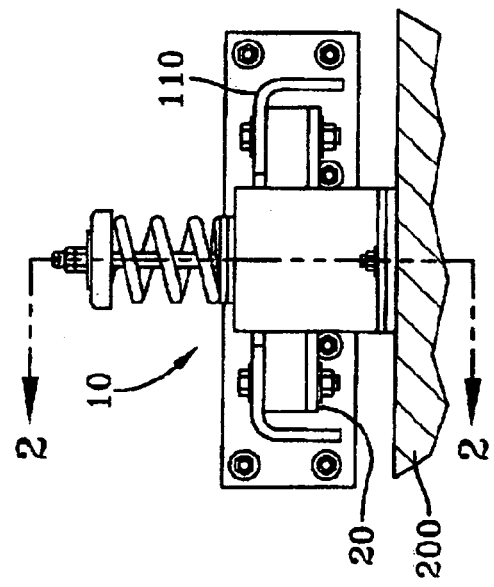

SEISMICALLY RESTRAINED VIBRATION ISOLATING MOUNTING DEVICE

BACKGROUND

The present invention is in the field of seismic isolators. More specifically this invention relates to seismically restraining equipment which must also be vibrationally isolated.

Building codes in many areas require that certain types of equipment be seismically restrained. Newer codes are increasingly requiring equipment mounting to meet a very wide range of seismic forces. In the past, a 1 G rating would work almost anywhere. Now there are applications with requirements as high as 3–4 G's and others with requirements as low as about 0.25 G's. Seismic restraints which can handle the peak loads are overkill for applications having only minimum seismic requirements. A seismically restrained vibration isolating mount is desired wherein the vibration isolator could be sized separately from the seismic restraint such that effectiveness could be maximized while cost is minimized.

Seismic capacity is typically limited by the isolator anchorage capacity. A seismically restrained vibration isolating mount is desired wherein the seismic restraining contact point is moved closer to the mounting surface thus significantly reducing the tipping loads that can be generated in the restraint housing. U.S. Pat. No. 4,356,992 by Donald E. Benkert discloses an earthquake protected vibration isolator where the seismic restraining contact point has been moved closer to the mounting surface to reduce the loads on the anchorage points. However in Benkert the equipment sits on top of the isolator, and so would have to be moved to change the spring. Also in Benkert, a portion of the snubber covers the spring, and thus the snubber plate would also have to be removed to change the spring. It is desired to have a seismically restrained vibration isolating mount wherein the vibration isolating resilient element is easily accessible, adjustable, and replaceable.

Further, in Benkert and other known configurations, the equipment is resting on top of the resilient element, which in turn is resting on the mounting surface. A seismically restrained vibration isolating mount with a more stable mounting configuration is desired.

SUMMARY OF THE INVENTION

A seismically restrained vibration isolating mounting device seismically restrains and vibrationally isolates equipment which is supported by an equipment support means, from the equipment supporting surface. This seismically restrained vibration isolating mounting device is comprised of a three-axis snubber mounted to the equipment supporting surface and which restrains the equipment support means; and a vibration isolator, wherein the equipment support means is supported by the vibration isolator and wherein the vibration isolator is supported by the equipment supporting surface, wherein the vibration isolator acts in the direction of gravity, and wherein the three axis-snubber is closer to the equipment supporting surface than the vibration isolator, and the vibration isolator is external to the three-axis snubber.

BRIEF DESCRIPTION OF THE DRAWINGS

FIG. 3 is a top view of a seismically restrained vibration isolating mounting device according to an aspect of the invention.

FIG. 4 is a front view of a seismically restrained vibration isolating mounting device according to an aspect of the invention.

FIG. 5 is a side view of a seismically restrained vibration isolating mounting device according to an aspect of the invention.

DETAILED DESCRIPTION

Figure 1:
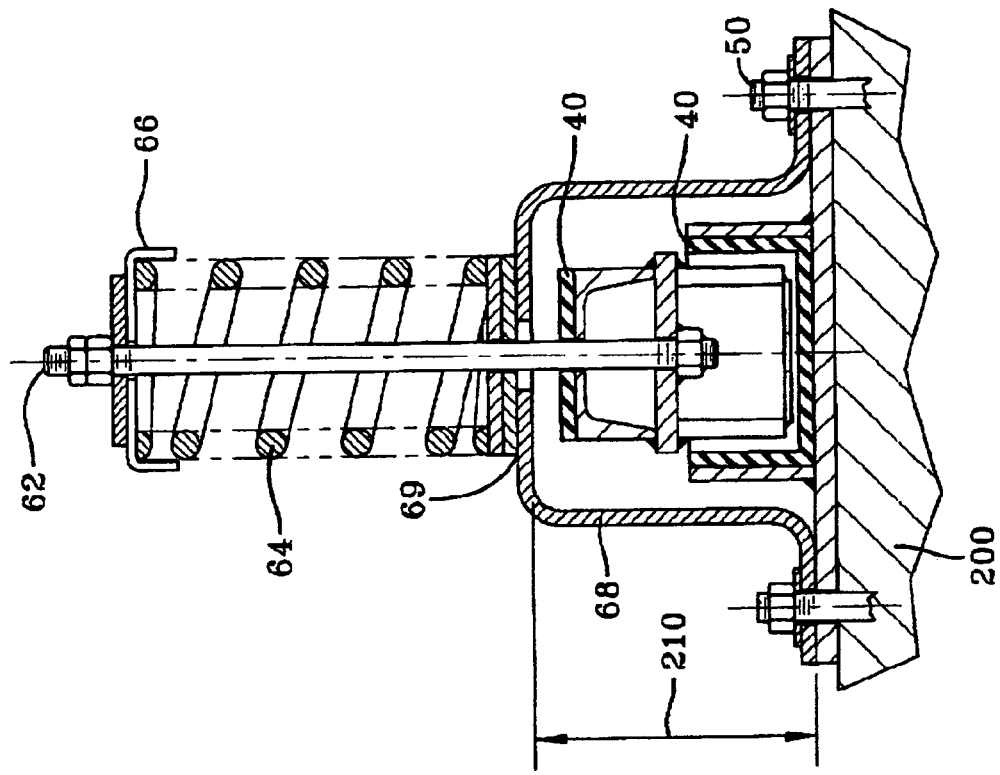
FIG. 1 is cross-sectional side view of a seismically restrained vibration isolating mounting device of FIG. 5 according to an aspect of the invention.
Figure 2:
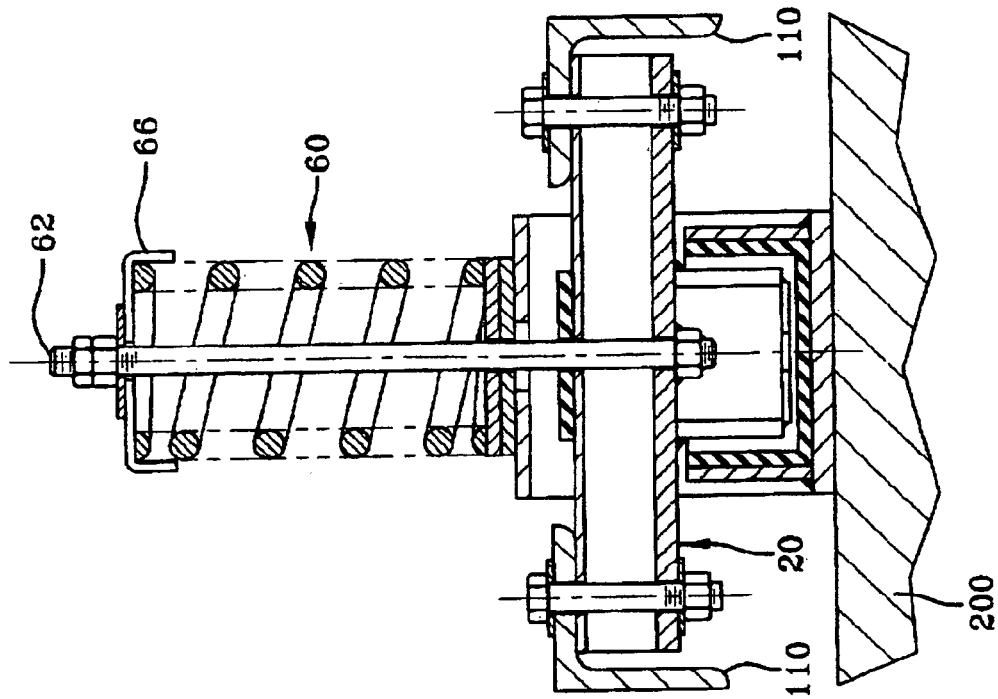
FIG. 2 is a cross-sectional view of a seismically restrained vibration isolating mounting of FIG. 4, device according to an aspect of the invention.

Various aspects of the invention are presented in FIGS. 1–14 which are not drawn to scale and in which like components are numbered alike. Referring now to FIGS. 1–5, according to an aspect of the invention, a seismically restrained vibration isolating mounting device 10 is shown. The mounting device 10 seismically restrains and vibrationally isolates equipment 100, which is supported by an equipment support means 20, from the equipment supporting surface 200 and comprises a three axis snubber 40 and a vibration isolator 60. A snubber is an apparatus which allows free movement during normal operating conditions, but restrains movement during abnormal conditions, which means it prevents axis snubber restrains this movement in both directions of all three axis.

According to an aspect of the invention, the three-axis snubber 40 is mounted to the equipment supporting surface 200. The equipment support means 20 is adapted for attachment to the equipment 100, and is restrained by the three-axis snubber 40. The vibration isolator 60 is supported by the equipment mounting surface 200; and the equipment support means 20 is supported by the vibration isolator 60. The vibration isolator 60 acts in the direction of gravity. The three axis-snubber 40 is closer to the equipment mounting surface 200 than the vibration isolator 60, and the vibration isolator 60 is external to the three-axis snubber 40.

FIGS. 3–5 show the equipment support means 20 attached to an equipment mounting bracket 110, and the equipment mounting bracket 110 attached to the equipment 100. This is for illustrative purposes only, as any suitable equipment support means adapted for attachment to the equipment falls within the scope of the invention.

According to a further aspect of the invention, the vibration isolator 60 comprises a resilient member 64 and an attachment means, wherein the vibration isolator 60 is supported by the equipment supporting surface 200. In a preferred embodiment, the attachment means comprises a hanger rod 62. Although there are many suitable attachment means, for simplicity only a hanger rod 62 is shown in FIGS. 1–5. This in no way limits the invention to the use of a hanger rod, as any suitable means for attaching the equipment support means 20 to the resilient member 64 is considered to be within the scope of the invention. The equipment support means 20 is mounted to the hanger rod 62 such that the equipment support means 20 is between the resilient member 64 and the equipment support surface 200, and the hanger rod 62 transfers the equipment load from the equipment support means 20 to the resilient member 64. The most commonly used resilient member 64 is a spring, and this is what is shown in FIGS. 1–5; however any appropriate resilient member may be used, such as, but not limited to, a neoprene element, a fiberglass element, or an air spring. The resilient member 64 is shown as an air spring 364 in FIG. 12, a neoprene element 164 in FIG. 13, and a fiberglass element 264 in FIG. 14.

When the equipment support means 20 is mounted to the attachment means between the resilient member 64 and the equipment support surface 200 as described above, the stability of the configuration is greatly increased over configurations with the equipment being supported on top of the resilient member. As mentioned above, seismic capacity is typically limited by the iso later anchorage capacity. One type of anchor typically used is a bolt, shown in FIG. 2 as 50. This configuration moves the seismic restraining contact point closer to the equipment mounting surface, thus significantly reducing the tipping loads that can be generated in the restraint housing. This configuration also allows a designer to specify a restraint element that has a capacity in line with the seismic requirement and independently specify a spring with a capacity in line with the equipment weight. These components can be mixed and matched at will so a high capacity coil with a light restraint unit would work well for low level seismic areas while a small coil with a heavy restraint unit would do the trick for higher level areas.

In a preferred embodiment of the invention, the vibration isolator 60 further comprises a load plate 66 and a resilient member support bracket 68, wherein the resilient member support bracket 68 is mounted to the equipment mounting surface 200. In this embodiment the load plate 66 transfers the equipment load from the hanger rod 62 to the resilient member 64, and the resilient member 64 is supported by the resilient member support bracket 68. In a further preferred embodiment, the resilient member support bracket 68 is a hat bracket having a middle portion 69, wherein the resilient support bracket 68 is mounted to the equipment supporting surface 200 such that there is a gap 210 between the middle portion 69 of the bracket 68 and the equipment supporting surface 200, and the three-axis snubber 40 is mounted to the equipment mounting surface 200 in the gap 210. According to an aspect of the invention shown in the Figures, the hat bracket middle portion 69 acts as the upper restraint for the snubber 40.

Figure 6:
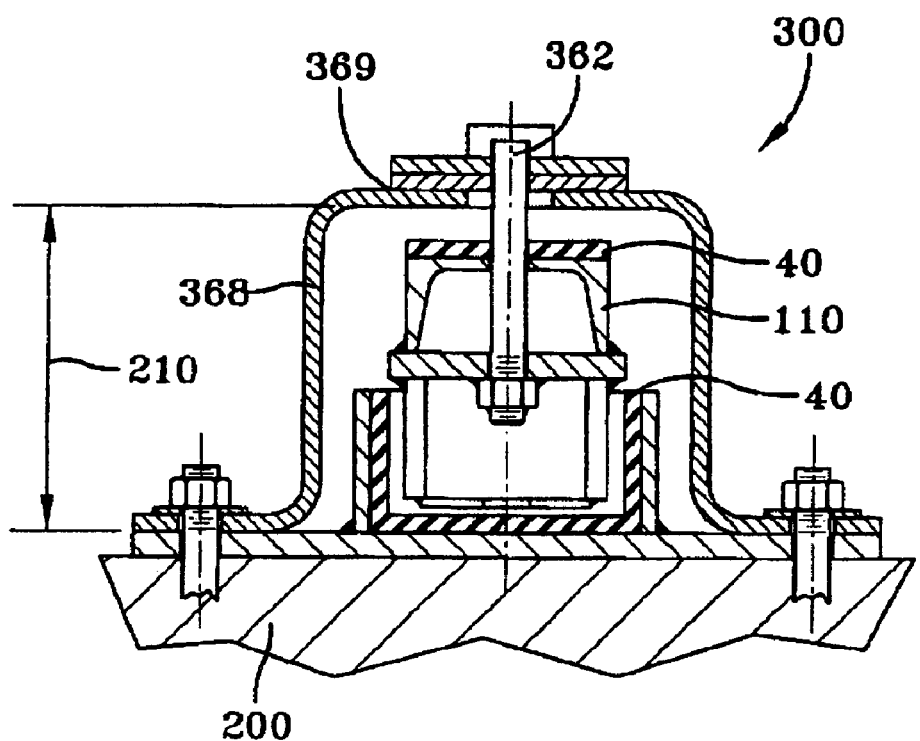
FIG. 6 is a cross-sectional view of a seismically restraining support device adaptable for vibration isolation of FIG. 8 according to an aspect of the invention.
Figure 9:
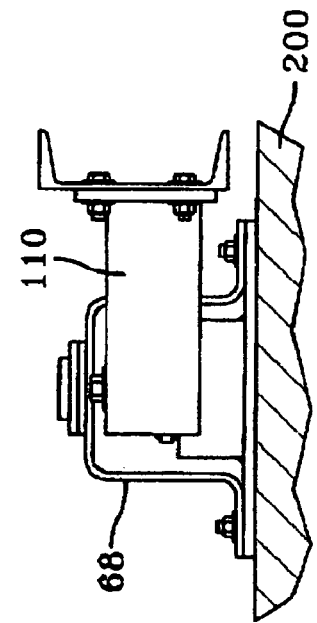
FIG. 9 is a side view of a seismically restraining support device adaptable for vibration isolation according to an aspect of the invention.
Figure 8:
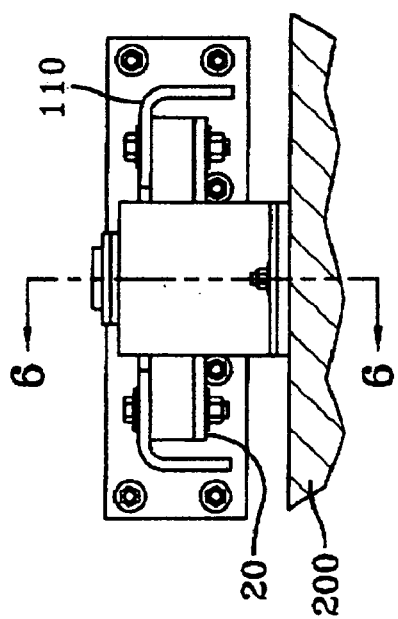
FIG. 8 is a front view of a seismically restraining support device adaptable for vibration isolation according to an aspect of the invention.

According to a further aspect of the invention, a seismically restraining support device is adaptable for vibration isolation. Certain applications require seismic restraint where the vibration isolating requirements are not immediately known. The present invention allows for having a seismic restraint for seismically restraining equipment which is mounted on an equipment supporting surface 200 without the vibration isolator; but configured such that a vibration isolator could easily be added at a later time. This adaptable seismic restraint 300 is shown in FIG. 6, 8, and 9, and comprises a three-axis snubber 40, an equipment support means 110, a support bracket 368, and a hanging means 362. The equipment support means 110 is adapted for attachment to the equipment, and is restrained by the three-axis snubber 40. The support bracket 368 is a hat bracket having a middle portion 369, wherein the support bracket 368 is mounted to the equipment mounting surface 200 such that there is a gap 210 between the middle portion 369 of the support bracket 368 and the equipment mounting surface 200, and the three-axis snubber 40 is mounted to the equipment mounting surface 200 in the gap 210. The equipment support means 110 is attached to the hanging means 362, and the hanging means 362 is supported by the support bracket 368. If at a later time vibration isolation is desired, the hanging means can be replaced by a hanger rod/vibration isolator combination as shown in FIGS. 1–5.

Figure 7:
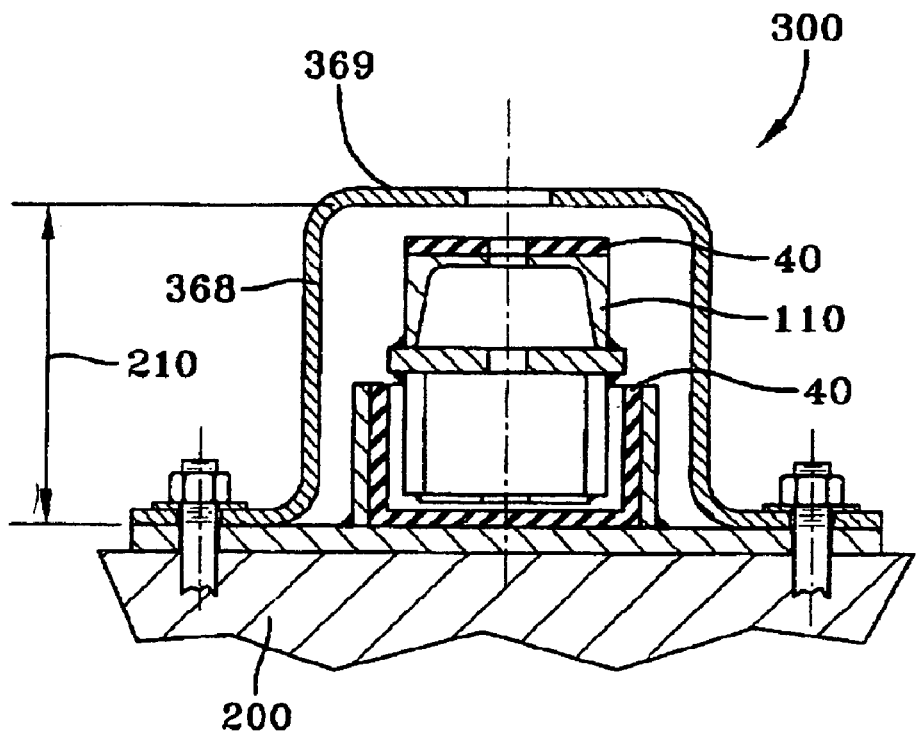
FIG. 7 is a cross-sectional view of a seismic restraint device adaptable for vibration isolation of FIG. 10 according to an aspect of the invention.
Figure 11:
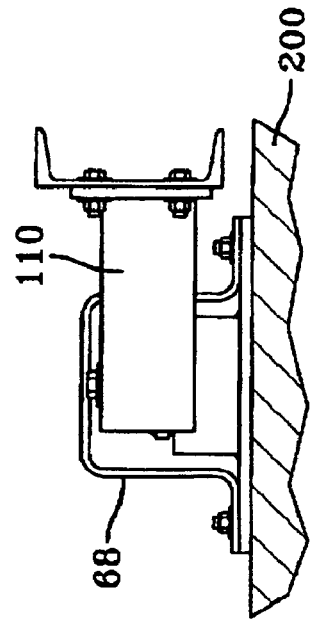
FIG. 11 is a side view of an adaptable seismic restraint according to an aspect of the invention.
Figure 10:
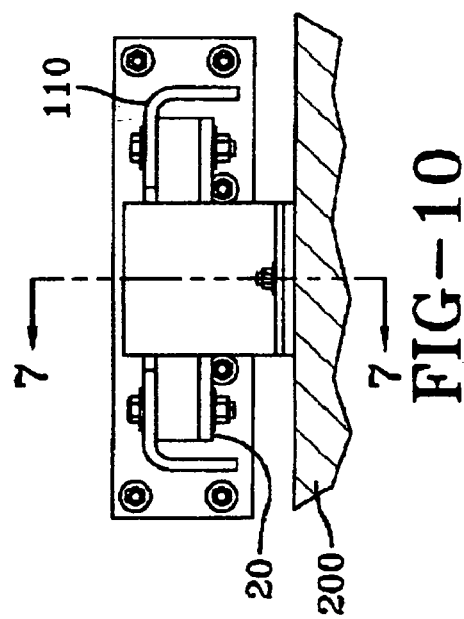
FIG. 10 is a front view of an adaptable seismic restraint according to an aspect of the invention.
Figure 12:
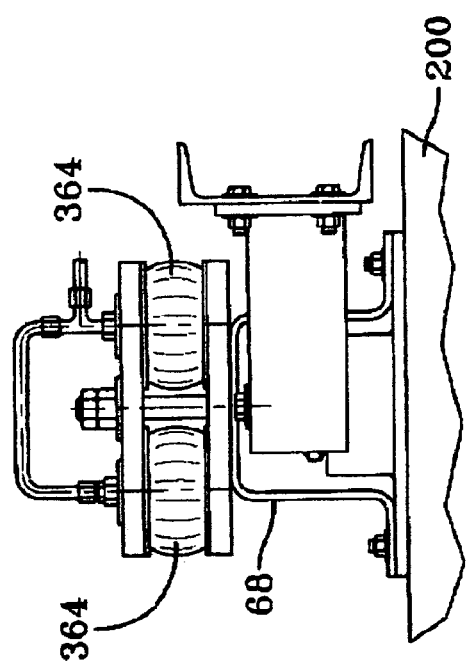
FIG. 12 is a side view of a seismically restrained vibration isolating mounting device with an airspring resilient member according to an aspect of the invention.
Figure 13:
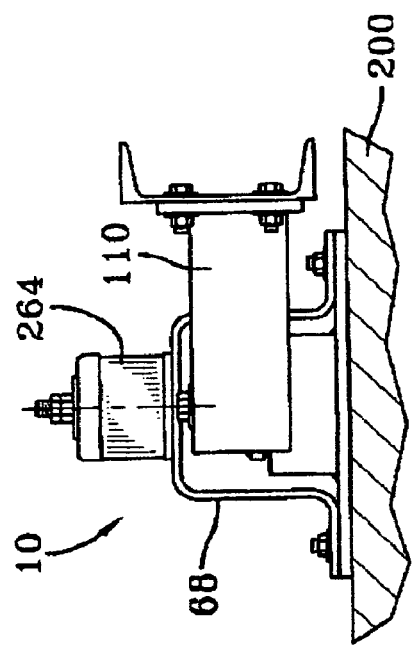
FIG. 13 is a side view of a seismically restrained vibration isolating mounting device with a neoprene element as a resilient member according to an aspect of the invention.
Figure 14:
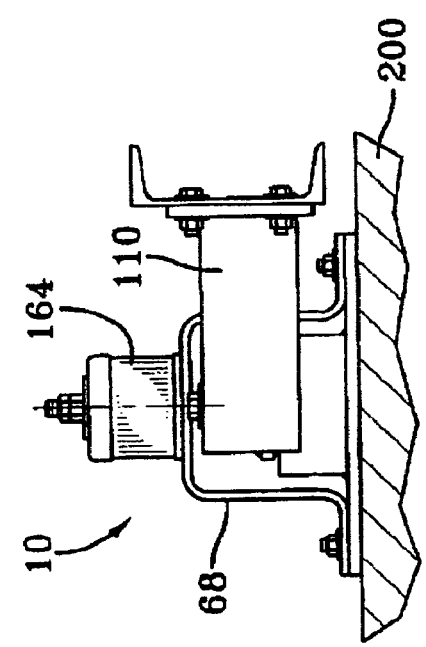
FIG. 14 is a side view of a seismically restrained vibration isolating mounting device with a fiberglass element as a resilient member according to an aspect of the invention.

Some applications already have a means for vibration isolation, but need a means for seismically restraining the equipment. According to a further aspect of the invention, a seismic restraint for seismically restraining equipment which is mounted on an equipment supporting surface 200 without the vibration isolator; but configured such that a vibration isolator could easily be added at a later time. According to this aspect, an adaptable seismic restraint 300 is shown in FIG. 7, 10, and 11, and comprises a three-axis snubber 40, an equipment support means 110, and a support bracket 368. The equipment support means 110 is adapted for attachment to the equipment, and is restrained by the three-axis snubber 40. The support bracket 368 is a hat shaped bracket having a middle portion 369, wherein the support bracket 368 is mounted to the equipment mounting surface 200 such that there is a gap 210 between the middle portion 369 of the support bracket 368 and the equipment supporting surface 200, and the three-axis snubber 40 is mounted to the equipment supporting surface 200 in the gap 210. This configuration acts solely as a seismic restraint, and would be used as such on equipment that is mounted to the equipment mounting surface 200 elsewhere, most likely through some type of vibration isolator. If at a later time it was determined that the vibration isolation was inappropriate for the installation, a vibration isolator 60 and hanging means 62 could easily be added (see FIGS. 1–5).

What is claimed is:

1. A seismically restrained vibration isolating mounting device for seismically restraining and vibrationally isolating equipment from an equipment mounting surface, wherein the equipment is supported by an equipment support means, said mounting device comprising:

a three-axis snubber adapted to mount to the equipment mounting surface, wherein said three axis snubber is adapted to restrain the equipment support means;

a vibration isolator, adapted to support the equipment support means wherein said vibration isolator is further adapted to be supported by the equipment mounting surface, wherein said vibration isolator acts in the direction of gravity, and wherein said three axis-snubber is closer to the equipment supporting surface than said vibration isolator, and said vibration isolator is external to said three-axis snubber, further wherein said vibration isolator comprises a hanger rod and a resilient member, wherein said hanger rod is adapted to mount the equipment support means such that the equipment support means is between said resilient member and the equipment mounting surface, and wherein said hanger rod transfers a load from the equipment support means to said resilient member, and further wherein said vibration isolator further comprises a load plate and a resilient member support bracket, wherein said resilient member support bracket is adapted to mount to the equipment mounting surface, wherein said load plate transfers the load from the hanger rod to the resilient member, and wherein said resilient member is supported by said resilient member support bracket.

2. A seismically restrained vibration isolating mounting device for seismically restraining and vibrationally isolating equipment from an equipment mounting surface, wherein the equipment is supported by an equipment support means, said mounting device comprising:

a three-axis snubber adapted to mount to the equipment mounting surface, wherein said three axis snubber is adapted to restrain the equipment support means;

a vibration isolator, adapted to support the equipment support means wherein said vibration isolator is further adapted to be supported by the equipment mounting surface, wherein said vibration isolator acts in the direction of gravity, and wherein said three axis-snubber is closer to the equipment supporting surface than said vibration isolator, and said vibration isolator is external to said three-axis snubber, further wherein said vibration isolator comprises a hanger rod and a resilient member, wherein said hanger rod is adapted to mount the equipment support means such that the equipment support means is between said resilient member and the said equipment mounting surface, and wherein said hanger rod transfers a load from the equipment support means to said resilient member, and further wherein said vibration isolator further comprises a load plate and a resilient member support bracket, wherein said resilient member support bracket is adapted to mount to the equipment mounting surface, wherein said load plate transfers the load from the hanger rod to the resilient member, and wherein said resilient member is supported by said resilient member support bracket, and further wherein said resilient member support bracket is a hat bracket having a middle portion, wherein said resilient support bracket is adapted to mount to the equipment mounting surface such that there is a gap between the middle portion of said resilient member support bracket and the equipment mounting surface, wherein said three-axis snubber is adapted to mount to the equipment mounting surface in said gap.

3. A seismically restraining support device adaptable for vibration isolation, for seismically restraining equipment which is mounted on an equipment mounting surface, comprising:

a three-axis snubber adapted to mount mounted to the equipment mounting surface;

an equipment support means which is adapted for attachment to the equipment, and which is restrained by said three-axis snubber;

a support bracket, wherein said support bracket is a hat bracket having a middle portion, wherein said support bracket is adapted to mount to the equipment mounting surface such that there is a gap between the middle portion of said support bracket and said the equipment mounting surface, wherein said three-axis snubber is adapted to mount to the equipment mounting surface in said gap; and, a hanging means, wherein said equipment support means is attached to said hanging means, and said hanging means is supported by said support bracket.

4. A seismic restraint device adaptable for vibration isolation, for seismically restraining equipment which is mounted on an equipment mounting surface, comprising:

a three-axis snubber adapted to mount to the equipment mounting surface;

an equipment support means which is adapted for attachment to the equipment, and which is restrained by said three-axis snubber; and a support bracket, wherein said support bracket is a hat bracket having a middle portion, wherein said support bracket is adapted to mount to the equipment mounting surface such that there is a gap between the middle portion of said support bracket and the equipment mounting surface, wherein said three-axis snubber is adapted to mount to the equipment mounting surface in said gap.

* * * * *